INVENTOR.
ARMIN ELMENDORF
BY Townsend and Townsend
ATTORNEYS

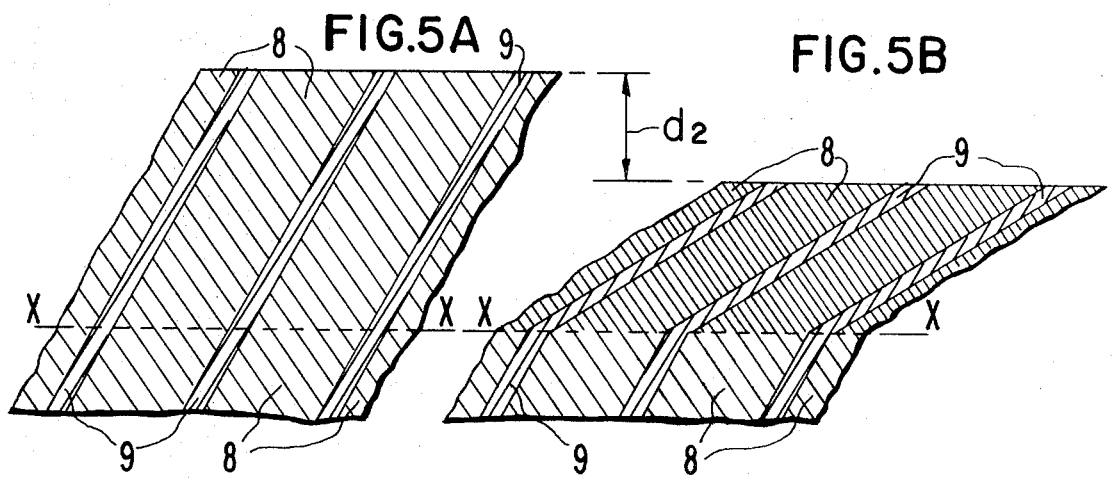
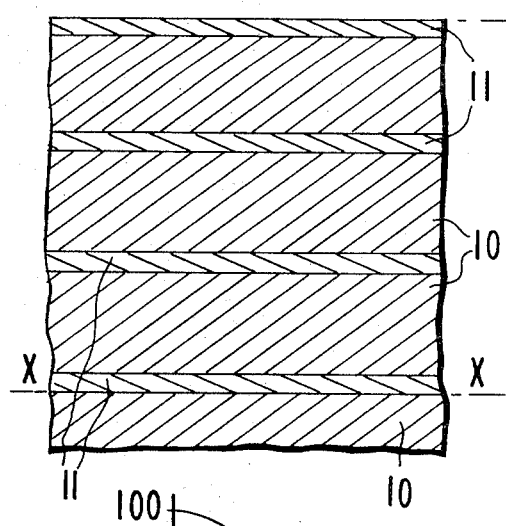
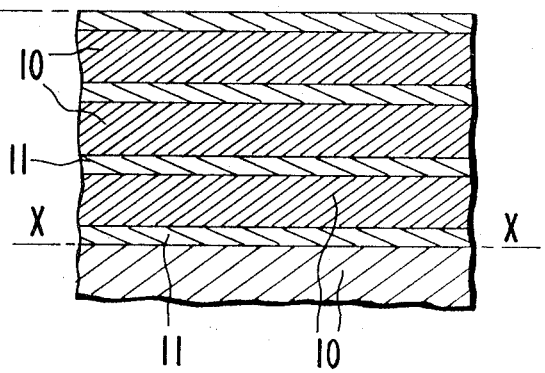
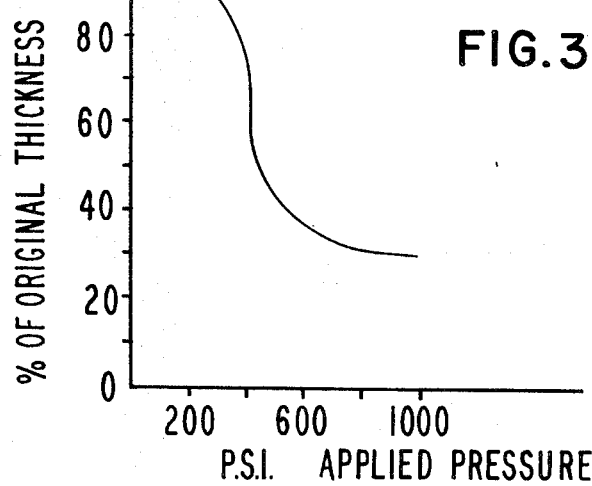

July 6, 1971  A. ELMENDORF  3,591,448
WOOD WITH A DENSIFIED SURFACE LAYER
AND METHOD OF MAKING SAME
Filed Aug. 15, 1966  7 Sheets-Sheet 3

INVENTOR.
ARMIN ELMENDORF
BY
ATTORNEYS

INVENTOR.
ARMIN ELMENDORF
BY Townsend and Townsend
ATTORNEYS

INVENTOR.
ARMIN ELMENDORF
BY Townsend and Townsend
ATTORNEYS 12 3,591,448
WOOD WITH A DENSIFIED SURFACE LAYER
AND METHOD OF MAKING SAME
Armin Elmendorf, Portola Valley, Calif.
(860 Charleston Road, Palo Alto, Calif. 94303)
Filed Aug. 15, 1966, Ser. No. 572,502
Int. Cl. B27m 1/02; B32b 5/14, 7/02
U.S. Cl. 161—164
13 Claims

ABSTRACT OF THE DISCLOSURE

This invention relates to a method of densifying wood to provide a board composed of ligno-cellulosic fibers arranged in annular rings containing spring and summer wood, in which the summer wood is of substantially the same density in each ring from one surface of the board to the opposite surface and the spring wood is compacted in an outer surface zone of the board between the rings of the summer wood without case hardening the wood.

---

Many woods, as for example, redwood and western red cedar, are so soft that when used for furniture or wall paneling they are easily gashed or scratched. Such injuries mar the appearance of the wood and greatly detract from its value. Means have, therefore, long been sought to harden the wood and thereby to render it more scratch resistant.

Hardening of wood by impregnation with synthetic resins is slow and costly and generally alters the color and other physical properties so drastically that this approach to the problem has had little success. One of the purposes of the present invention is to harden wood without resorting to resin impregnations.

Two methods for hardening wood without impregnation have been proposed, resulting in products called Staypak and case hardened wood, respectively. The major purpose of the present invention is to provide wood with a densified surface layer which differentiates it from Staypak, and case hardened wood, and eliminates some of the undesirable features of these products.

It is well known that wood can be plasticized by heat in the presence of moisture. This fact is utilized in the production of Staypak, developed at the U.S. Forest Products Laboratory and described in "Wood and Cellulose Science," by Alfred J. Stamm.

In making Staypak a block of natural wood is subjected to very high pressure, in the range of 1500 to 2500 p.s.i., in a hot press and preferably with side constraint in a mold so that it cannot bulge out sidewise, at elevated temperatures generally ranging from 300 degrees to 360 degrees F. The pressure and temperature must be high enough and the time under pressure must be long enough so that the temperature of the wood throughout its thickness reaches the temperature of the press and the wood has been compressed to a specific gravity of about 1.3. If a Staypak board 1-inch thick of redwood is desired, the original thickness of the block must be about 3 inches. A great deal of time is required to raise the temperature at the center of such a thick block to the point at which the wood is adequately plasticized. Stamm found that at least 1 hour is required to get sufficient heat to the center of panels 1-inch thick. The press must be chilled while retaining the pressure. This adds to the time so that the cycle of heating and cooling requires substantially more than 1 hour. On account of the long time in the press under the high temperatures involved, the color of the wood turns to a dull brown, and the natural color of the wood is lost. With that the contrast in colors of various areas of the natural wood is destroyed. It is this contrast which characterizes natural wood and gives it its unique charm. The Staypak process therefore destroys the beauty of natural wood. Furthermore, on account of the large amount of wood required for the desired thickness of final product, and the small yield and high cost of the press, the manufacture of Staypak is expensive. The uses of the product are therefore restricted.

Among the purposes of the present invention is to produce an improved form of densified wood which does not greatly reduce the over-all thickness, does not require high pressures, does not appreciably change the natural color of the wood, and requires only a small fraction of the time required for making Staypak.

In case hardened wood the fibers at the surface are crushed to their maximum density, which according to C. H. van Hartesveldt et al, in their U.S. Patent No. 3,171,167 results in a specific gravity in the range of 1.3 to 1.4. They show that the specific gravity of case hardened wood varies from this ultimate density at the surface to that of the uncompressed original wood in the body of the board where the specific gravity may be only 0.4. They state that the density gradient in the compression layer is approximately linear in going, for example, from the specific gravity of 1.3 to 0.4. The case hardening effect is obtained by forcing boards lengthwise through a die in which the surface fibers are progressively pressed inwardly as they are driven against a short inclined plane. In this action serious shear stresses are introduced that tend to shear off a surface layer of wood which, they state, may actually strip off a layer if the inclined plane is too steep. Such stresses also tend to bow the board. Their presence requires treating both surfaces to balance the stresses. The term "case hardening" is used in this application to mean the treatment of wood, as described in this paragraph and in the referenced van Hartesveldt et al. patent.

Among the purposes of the present invention is to provide wood with a hard surface layer of appreciable thickness in which the density is substantially uniform through the thickness of this layer from the surface to the body of natural unchanged wood fibers. The skin effect of case hardening is eliminated. The shear stresses described are eliminated, and a flat straight board is obtained even when only one side has been densified.

In our process, excellent hardness of surface is obtained at densities below those of complete densification.

In case hardening, as described by Hartesveldt et al., the moisture must be driven off. We eliminate the need for preheating to drive off moisture. In place of this we trap the moisture and thereby obtain the plasticizing effect of moisture that cannot escape.

One purpose of the present invention is to densify wood in a layer of appreciable thickness at the surface of a board in such a manner that the wood is not case hardened and the density of the summer wood of the annual ring is not materially affected.

Another purpose is to achieve densification by compacting the spring wood between the annual rings of summer wood so that the density of the spring wood in the compacted zone is substantially the same through the thickness of the compacted zone. The density of the spring wood is materially increased so that in general it is at least twice the density of the natural spring wood.

Another purpose is to eliminate the stresses that tend to distort or bow a long board when it is forced through a die.

Another purpose is to obtain surface densification by deflecting the annual rings in coniferous woods from their natural direction with respect to the board surface.

Another purpose is to obtain a planar surface of densified wood on a board in which the grain had been raised in the original wood.

For a better understanding of the process and the results achieved reference may be made to the accompanying figures in which:

FIG. 3 is a graph of percent of original thickness plotted against applied pressure for compression of redwood across the grain at 300 degrees F. and 8% moisture.

Figure 4A:
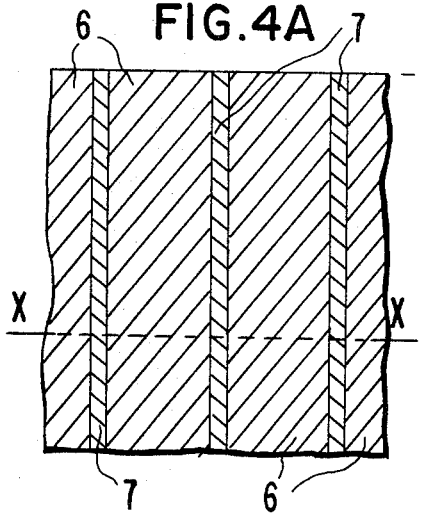
Figure 4B:
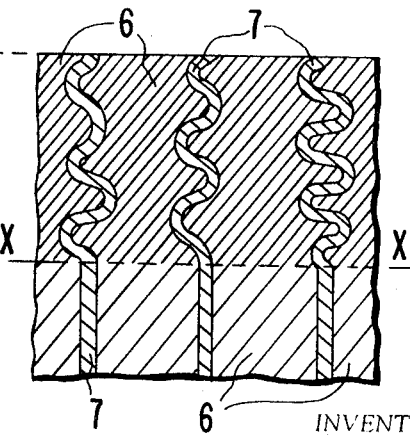

FIGS. 4A and 4B, respectively, show sections through the annual rings of an edge grain board before and after densifying the surface.

FIGS. 5A and 5B, respectively, show sections through several annual rings at the surface of a rift-cut board before and after densification.

FIGS. 6A and 6B, respectively, show sections through the surface of a flat-cut board before and after it has been densified.

Figure 7:
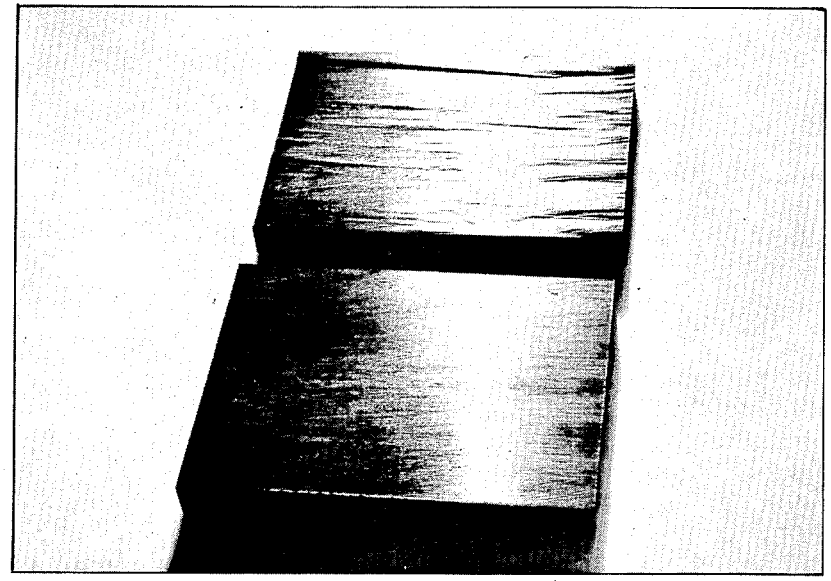

FIG. 7 is a photograph showing the surface of two redwood boards, one of which has had its surface densified in accordance with the present invention.

Figure 8:
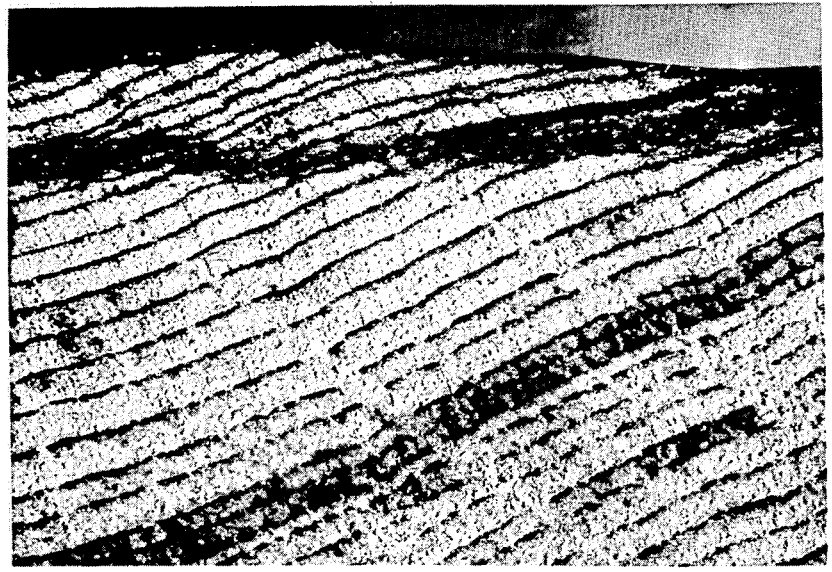
Figure 9:
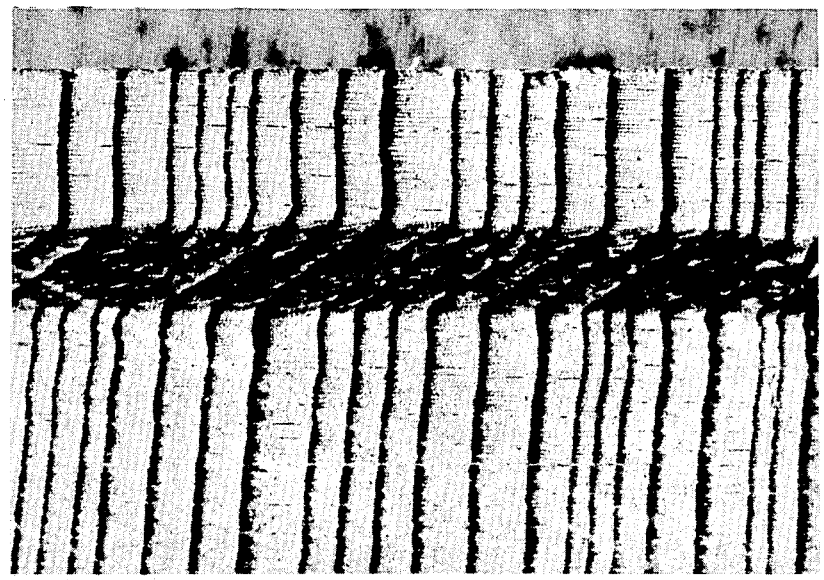

FIGS. 8 and 9 are photomicrographs through the annual rings at the surface of redwood boards wherein certain steps of the present invention have been incorrectly used.

FIGS. 10 through 16 are photomicrographs through the annual rings of various ring structures at the surface of redwood and western red cedar boards, that have been surface densified in accordance with the present invention.

Figure 1:
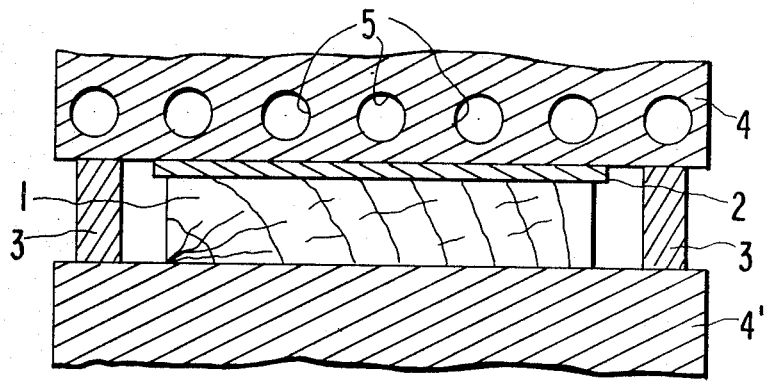
FIG. 1 is a diagrammatic representation of one form of the equipment used for surface densification.

As shown in the drawings:

The apparatus of FIG. 1 consists of a press having unheated platens, or platens that are cooled by an appropriate cooling liquid such as water. While the temperature of the platens may rise slightly above room temperature because they are not cooled rapidly enough, they are referred to herein as cold platens because they are not deliberately heated. In this figure, 1 shows the board to be surface-densified on one side, and 2 is a removable plate or caul, preferably of polished metal here referred to as the heat transmission plate.

If the board 1 is to be surface hardened on one surface only, then only the top platens need be cooled. Cooling may be done by circulating cold water through the tubes, 5. If both surfaces are to be hardened then both platens must be provided with means for cooling.

Figure 2:
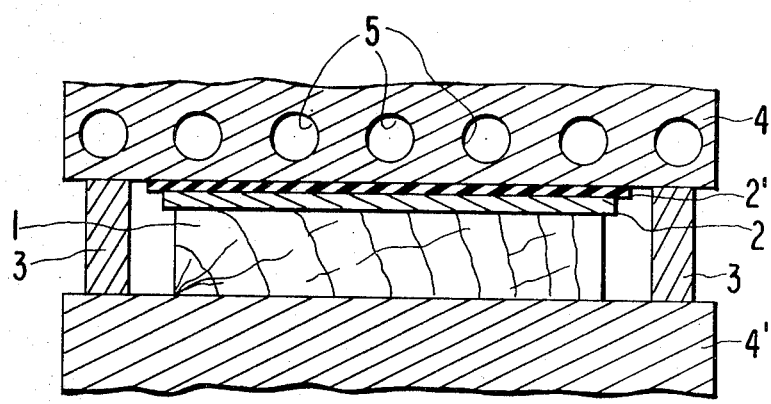
FIG. 2 shows a modified form of suitable equipment for carrying out the process.

In FIGS. 1 and 2, stops 3 are inserted between the press platens to arrest the closing of the press, and 4 and 4' are the platens of a press. In carrying out our process the plate 2 is heated to a temperature generally well above about 250 degrees F., outside the press. The temperature used depends upon the heat capacity of the plate, the thickness of the wood to be densified, and above all on the speed of bringing the heated plate into position and closing the press. A plate temperature of 250 degrees F. to 450 degrees F. has been used with satisfactory results. The board of natural wood is preferably of a conifer or softwood on account of the great difference in density between the spring wood and the summer wood of softwoods and the ease of crushing the spring wood. The board has a moisture content of at least about 6%, the moisture at which lignin plasticizes at the temperatures used. A moisture content above the fiber saturation point, that is, a moisture content in which free water is present is undesirable. The moisture of the specimen should therefore be in the range of about 6% to 30%.

The term spring wood applies to that portion of the annual ring grown early in the season characterized by cell walls that are much thinner than those grown later in the season generally referred to as summer wood. When seen in cross section, most of the section of spring wood is taken up by the large, almost circular, hollow known as the lumen. In summer wood the lumen is smaller, the cells appear to be flattened, and the cell walls are much thicker. Considerable magnification is called for to see the cell walls, since the diameter of the fiber or cell is only about $\frac{1}{1000}$-inch.

When subjected to elevated temperatures in the presence of moisture the cell walls of both the spring wood and the summer wood are plasticized. Plasticization takes place in the presence of hygroscopic as well as free moisture in view of the fact that when free moisture is present in the lumen the cell walls contain hygroscopic moisture. We have found that by progressively increasing the pressure perpendicular to the fibers of plasticized softwoods, a pressure is reached at which there is a relatively sudden collapse of the cell walls of the spring wood. If thereafter the temperature is rapidly reduced and with that the degree of plasticization, it becomes possible to compact the spring wood to less than half its natural thickness without materially affecting the thickness of the summer wood.

Tests were made to determine the pressure at which the compression or yield of redwood per unit of pressure was the greatest. The resultant data when plotted yielded a sigmoid curve as shown in FIG. 3, from which it will be seen that the slope of the curve is greatest at about 400 p.s.i. At that pressure the rate of yield of the spring wood per unit of pressure is the greatest and the spring wood appears to collapse suddenly. The yield point can be readily determined for each wood for each combination of temperature and moisture, subject of course, to wide variations in the compressive strength of wood across the grain. For the softwoods the pressure at the yield point seems to range from about 300 to 800 p.s.i. for 6 to 10% moisture and temperatures in the range of 300 degrees F. to 400 degrees F.

The transmission plate 2 may be heated in an appropriate oven, or by other heating means such as infra-red lamps, until its temperature is above 300 degrees F. While some densification is possible at temperature as low as 250 degrees F. the degree of stabilization and the depth of the treatment is generally inadequate. At plate temperatures above 450 degrees F., the wood may be darkened with loss in the natural color of the wood.

In carrying out our process, the heated transmission plate 2 is inserted between the specimen 1 and the press platen 4 while the press is open. Pressure is then quickly applied and rapidly increased, thereby raising the surface temperature, and the pressure is increased until it exceeds that at which the collapse of the spring wood takes place due to plastic yield. Collapse is limited to those spring wood fibers that have reached the critical temperature for maximum plastic yield. At this point it is important to note that immediately upon the application of pressure heat begins to flow from the hot transmission plate into the wood and, simultaneously, on the opposite side heat flows in the opposite direction into the cold press platens. The rate at which the heat is drawn off by the cold press platen must not be so high that the critical temperature at which the cell walls of the spring wood collapse is never reached. The critical temperature for collapse is generally above 300 degrees F. at a pressure for redwood of about 400 p.s.i. Because heat is drawn off rapidly by the wood on one side and by the press platen on the other, the temperature of the transmission plate when inserted into the press must be above the critical temperature of collapse. A temperature in the hot plate of 450 degrees in a steel plate ¼-inch thick may be used without serious darkening of the wood. The time at maximum temperature is too short for damage. It should also be noted at this point that the heat capacity of the transmission plate must be ample. If the desired results can only be achieved with a plate that is too heavy for easy handling a thinner plate may be used by separating it from the cold press platen with a sheet of some thermal insulation 2' (see FIG. 2) to retard the flow of heat into the press platen. A thin sheet of silicone rubber serves this purpose well in combination with an ⅛-inch steel plate. In this way the temperature of the wood may be raised and the thickness of the zone of fiber collapse increased.

A remarkably high speed of surface densification on a ¾-inch board of redwood can be obtained in this manner so that the cycle of operations can all be performed in from 1 to 3 or 4 minutes. In that time the press is closed, the temperature of the wood has been raised to at least 250 degrees F. to a depth of about ⅛-inch, the pressure has been raised to about 400 p.s.i., the wood has collapsed and the stops have been reached, while in the opposite side of the transmission plate the heat is being drawn off and continues to be drawn off until the temperature of that plate and of the wood have been reduced to about 150 degrees F., whereupon the press is opened. The temperature of the wood when the pressure is released should be substantially below 212 degrees F. to prevent spring back and a corrugated surface. Satisfactory results are obtained if the plate temperature at the time of pressure release is 150 degrees F.

FIG. 4A is a sketch through a small section of a board of a softwood such as redwood, at the edge of the board, greatly magnified, in which the annual rings are perpendicular to the surface as in edge grain lumber. In softwoods there may be from 4 to 60 or more rings per inch. The spring wood 6 is generally several times as wide as the summer wood 7. After densification the summer wood assumes the sinuous shape shown in FIG. 4B. Densification has taken place up to the plane X—X. In boards that are rift-cut the annual rings make an acute angle with the surface as in FIG. 5 although wide boards may show all three types of wood structure, namely, edge, rift and flat. As shown in FIG. 5 the spring wood 8 is compacted in accordance with this invention while the summer wood 9 is not substantially compacted. FIG. 6 shows the disposition of the rings in flat-cut boards, wherein the layers of spring wood 10 and of summer wood 11 are parallel to the board surface. It is significant to note that in a densified rift-cut board as shown in FIG. 5B the summer wood 9 has been deflected so that the angle it makes with the surface is sharper after densification, and in the case of a densified flat-cut board as shown in FIG. 6B all the layers of spring wood 10 are densified about equally up to the plane X—X below which no densification takes place.

In a section of any wide board of a softwood the width of the annual ring, the ratio of summer wood to spring wood, as well as the direction of the rings relative to the board surface may vary widely. As summer wood expands more than spring wood, most softwood, will in time "grain raise." By densifying the spring wood as in our process such surface unevenness is removed and a planar surface is obtained. The spring wood between any two bands of summer wood has been compacted to substantially the same density from the board surface to the plane of no densification. The shift from this density to that of the original wood is quite abrupt. The density of the spring wood due to densification is generally from 2 to almost 3 times that of the original spring wood. The thickness of the densified zone is not uniform, this layer having a planar surface on the outside and an uneven surface on the inside.

The pressure at which plastic yield takes place at the maximum rate (collapse) may range from 300 to 800 p.s.i. and is always far below the pressures used in making Staypak.

After the stops have been reached the pressure is maintained while the temperature of the wood falls and until it approaches room temperature. The temperature of the transmission plate at removal is always substantially below 212 degrees F. In order to prevent spring back and a corrugated surface, the temperature of the wood when the press is opened should preferably be nearer room temperature than 212 degrees F. When so cooled the boards may be handled without discomfort to the hands.

FIG. 7 shows two redwood specimens ¾-inch thick cut from the same board, end to end. The specimen in the foreground was processed in accordance with this invention by heating the heat transmission plate to 330 degrees F., without pressure, then introducing the plate and the cold specimen in a cold press, applying pressure rapidly in the cold press to stops, and removing the specimen when the temperature had fallen below 150 degrees F. The specimen in the background was heated to 330 degrees F. in a hot press and pressed to the same stops for 2 minutes whereupon it was pulled hot out of the press. The spring back was pronounced and resulted in a corrugated surface. FIG. 8 shows a magnified section through one of the corrugations, from which it will be noted that some densification remained at some distance from the surface but the spring wood between the densified zone and the surface had sprung back to such an extent that it caused a pronounced ridge. The dark line at the surface shows a thermosetting resin which had been applied to the surface.

FIG. 9 shows a section through the edge of a redwood board that had been heated without pressure in a hot press at 320 degrees F. for 2 minutes in order to dry the surface. It was then inserted in a cold press and rapidly pressed to stops, and then cooled in the press. It is significant to note that drying the surface of the board by heating, then pressing in a cold press to stops caused the wood to become densified at a distance away from the surface in a zone from which the moisture had not been driven, and that no densification took place at the surface where the moisture had been removed.

Figure 10:
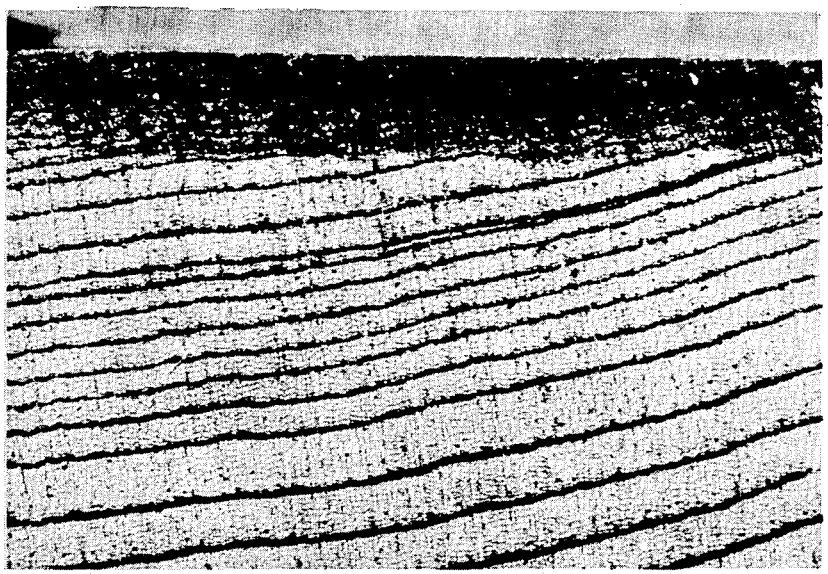
Figure 11:

FIG. 10 shows a section through the edge of a redwood board that had been subjected to heating with a heat transmission plate at 320 degrees F. under a pressure of 500 p.s.i. in a cold press with rapidly applied pressure and without stops, maintaining the pressure until the temperature of the wood was well below 150 degrees F., and FIG. 11 shows a section through the same board which had been subjected to the same conditions except for the temperature of the transmission plate which was 420 degrees F. The overall thickness of the board which was originally 0.75-inch was reduced to 0.55-inch, apparently by the high pressure continuously applied without stops. The thickness of the densified layer at the surface of the specimen of FIG. 10 was 0.04-inch and of the specimen of FIG. 11 was 0.08-inch, showing the effect of increasing the temperature of the transmission plate from 320 degrees F. to 420 degrees F. The specimen of FIG. 11 also shows the great densification of the spring wood in the densified layer which is less than half its original thickness. This figure also illustrates the sharp demarcation between the densified layer and the original wood and the extent to which the bands of summer wood are deflected by the collapse of the spring wood as previously indicated in FIG. 5. A slight reduction in the compacting of the spring wood cells is indicated in a zone near the surface apparently due to some loss of moisture in this zone caused by the high temperature of the transmission plate.

Figure 12:
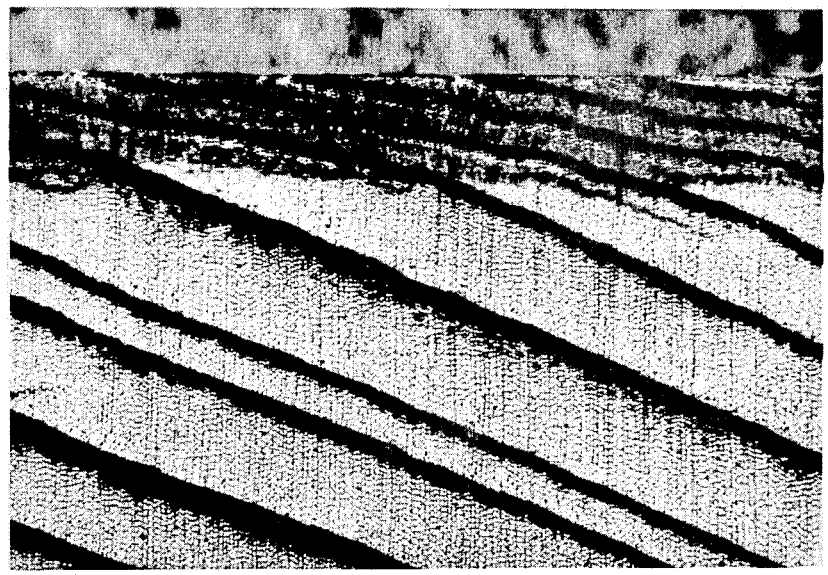

FIG. 12 shows a section through the edge of a rift-cut redwood board after densification, in which the annual rings were wider than in the previous specimens. The temperature of the transmission plate was 330 degrees F. The thickness of the compacted layer was 0.05-inch. This figure is significant in showing the fact that the densification takes place substantially in the spring wood and there is no visible increase in the density of the summer wood. The size of the wood cells relative to the width of the spring wood rings is also illustrated in this figure.

Figure 13:
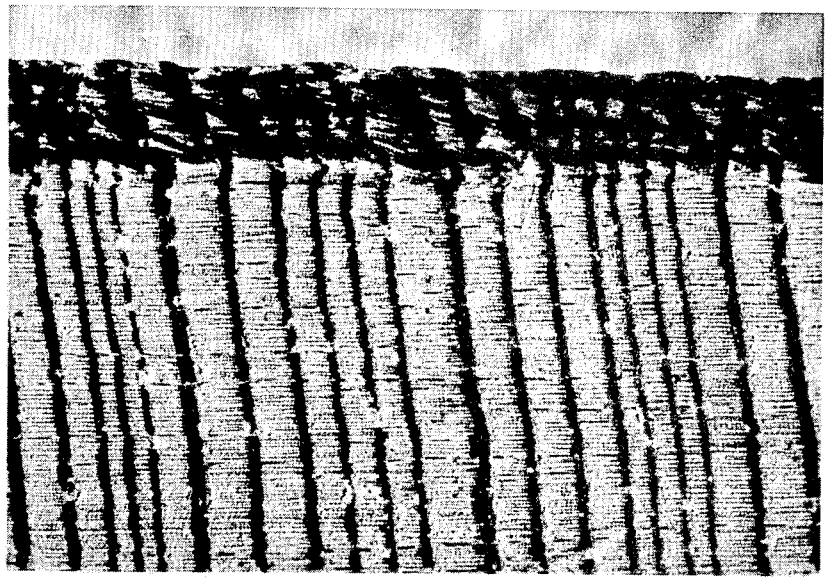

FIG. 13 shows a section through the edge of an edge grain redwood board after densification in which the transmission plate had been heated to 330 degrees F. The thickness of the resultant densified layer was 0.04-inch. This figure shows how the summer wood bands assume a wavy contour due apparently to the fact that the cells do not collapse as do those of the spring wood.

This figure confirms the results previously shown in the sketch of FIG. 4.

Figure 14:
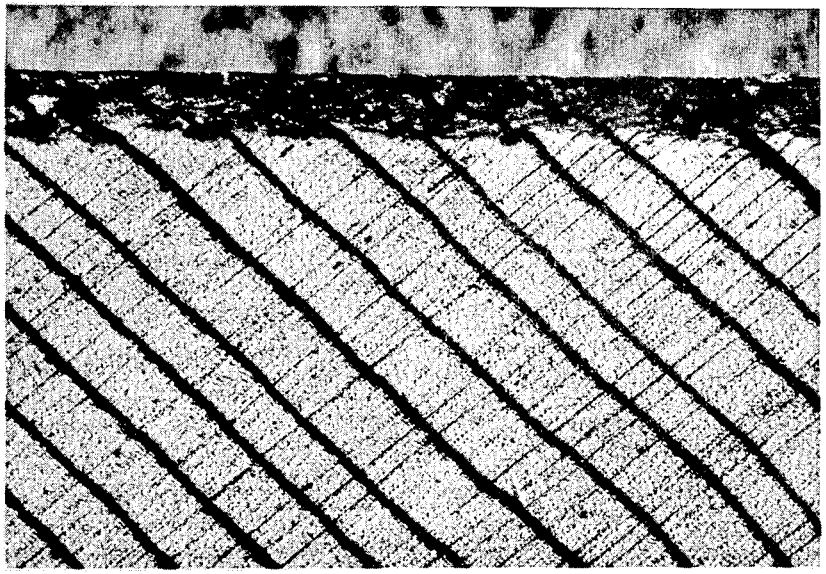

FIG. 14 shows a section through an edge of a rift-cut redwood board after densification in which the transmission plate had been heated to 250 degrees F. The bands of summer wood have doubled up into sinuous shape from the board surface to the plane where the densification stops and the spring wood fibers are not compacted. The thickness of the compacted layer is only about 0.02-inch, indicating a falling off in the thickness with reduction in temperature of the transmission plate.

Figure 15:
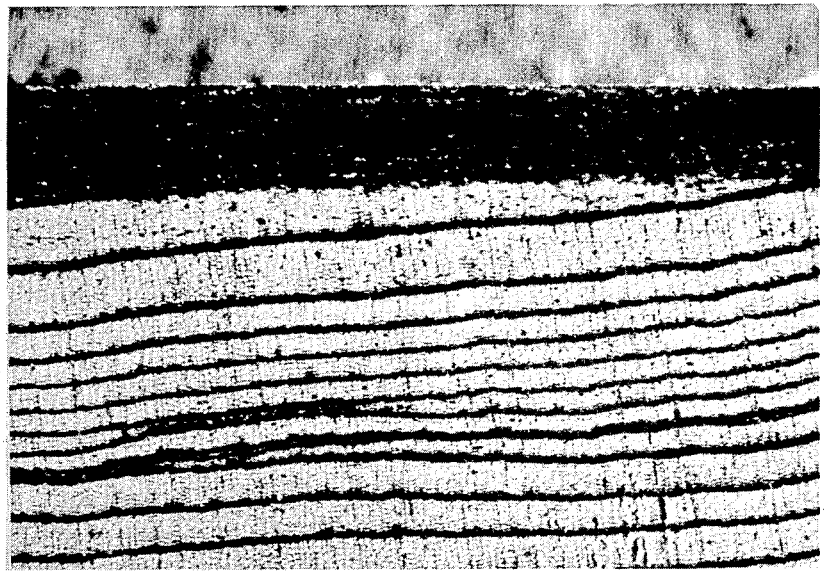

FIG. 15 shows a section through an edge of a flat-cut redwood board after densification in which the transmission plate had been heated to 330 degrees F. The thickness of the six annual ring layers of the compacted zone is to be compared with the thickness of six ring layers that are not compacted. The results may be compared with those sketched in FIG. 6.

Figure 16:
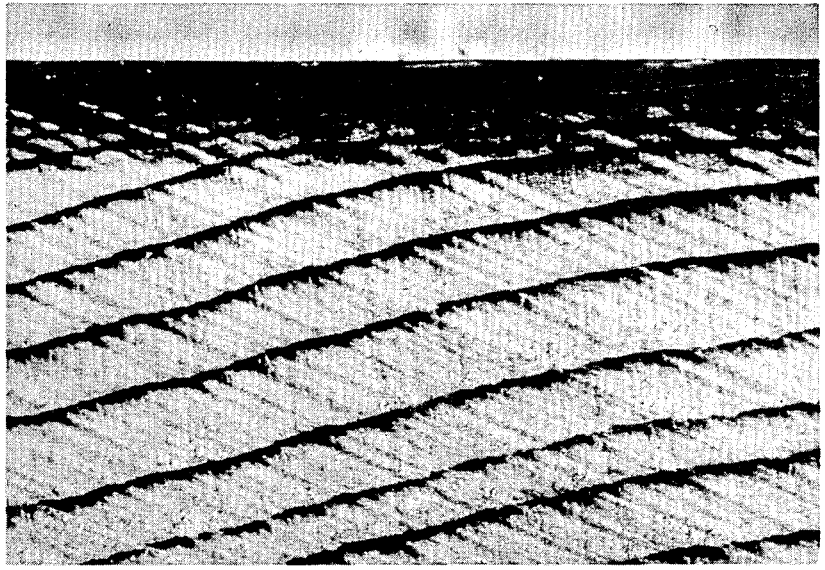

FIG. 16 shows a section through an edge of a rift-cut western red cedar board after densification in which the transmission plate had been heated to 330 degrees F. The density of the spring wood in the compacted zone is about 3 times that of the original spring wood.

It will be noted from the various photomicrographs of FIGS. 10 to 16, that the thickness and the density of the spring wood after collapse is substantially the same throughout the thickness of the compacted zone, and that the thickness and density of the summer wood has not been visibly altered. The results therefore differ basically from those of case hardened wood. In case hardened wood there is a progressive and linear falling off from a skin specific gravity of about 1.3 at the surface to the specific gravity of the original wood at the bottom of the compacted zone.

It is significant that the density of the compacted spring wood in flat cut boards is about the same in the respective layers of spring wood superimposed one above the other, due probably, to the fact that the compacting pressure per small unit of area, that is, the specific pressure exerted by one layer upon the next lower layer is substantially the same.

The pressure used is generally about 500 p.s.i. It determines the speed at which the stops are reached.

Slight further improvement of surface can be obtained if the surface of the board is coated with a thermosetting resin such as phenol formaldehyde resin or melamine resin before the board is inserted into the press and there subjected to heat. The board may also be coated with a thermoplastic resin such as a polyvinylchloride, or a thin vinyl film may be placed on the wood surface before the board is placed in the press. If a thermosetting resin is used or an overlay impregnated with a thermosetting resin the temperature of the hot plate and the time of pressing may be increased with more insulation to obtain full polymerization. This increased time is not necessary when a vinyl film is used as the film fuses immediately upon reaching the fusing temperature, whereupon it may be chilled. When the panel is removed from the press the temperature has fallen and the film no longer adheres to the transmission plate. A vinyl film only 2 mil thick is adequate to prevent the water spotting which takes place in all wood compacted at elevated temperatures when sprayed with water.

A single ply of veneer of a softwood may be densified in a similar manner, in which case the spring wood is compacted throughout the thickness of the veneer.

The veneer of a fiber board faced with a softwood veneer may be densified if the hardness of the fiber board exceeds that of the veneer. The fiber board may be a conventional hardboard or a particle board.

Although the foregoing invention has been described in some detail by way of illustration and example, for purposes of clarity and understanding it is understood that certain modifications can be practiced within the spirit of the invention as limited only by the scope of the appended claims.

What is claimed is:

1. A board of natural wood composed of ligno-cellulosic fibers arranged in annual rings containing spring and summer wood, in which the summer wood is of substantially the same density in each ring from one surface of the board to the opposite surface and the spring wood is compacted in an outer surface zone of the board between the rings of the summer wood without case hardening the wood.

2. A wood product comprising at least one densified, natural wood face layer at at least one surface of the product, said layer being composed of ligno-cellulosic fibers arranged in annual rings made up of spring and summer wood, the summer wood in all of said rings of said layer having substantially the density of such summer wood in natural undensified wood, the spring wood in said layer being compacted between the rings of summer wood under pressure directed normal to the exposed surface of the product.

3. The product in accordance with claim 2 wherein said product is a board of natural wood.

4. The product of claim 2 wherein said layer is at least a portion of a veneer.

5. A board of natural wood composed of ligno-cellulosic fibers arranged in annual rings in which the summer wood in those rings that extend from one surface to the opposite surface of the board is of substantially the same density throughout this distance, the spring wood in a zone adjacent to at least one surface is compacted to at least twice its natural density without case hardening the wood, and the direction of the summer wood rings in the zones containing the compacted spring wood has been deflected from its natural direction.

6. A board of natural wood composed of ligno-cellulosic fibers arranged in annual rings in which the thickness of the summer wood near the board surface is substantially the same as in the body of the board, the spring wood in a zone adjacent to at least one surface is compacted to a density at least two times its naural density without case hardening the wood, and both the spring wood and the summer wood in the body of the board have their natural density.

7. A veneer composed of natural ligno-cellulosic fibers arranged in annual rings containing spring and summer wood, the spring wood in the veneer having been compacted without compacting the summer wood and without case hardening.

8. A panel consisting of a fiber board base and a face veneer bonded to at least one surface of the base, the hardness of the base exceeding that of the veneer, and the veneer is composed of ligno-cellulosic fibers arranged in annual rings, the spring wood in the veneer being compacted to at least twice its natural density and the summer wood is substantially uncompacted.

9. The method of densifying the surface of natural wood which consists of the steps of,
  selecting wood having a substantial difference in the density of the spring wood and the summer wood and whose moisture content is above about 6%,
  heating a flat plate to a temperature above about 250 degrees F.,
  inserting the heated plate between the wood and a cold press platen,
  quickly applying pressure on the wood and increasing the pressure rapidly while heat passes from the plate into the wood until the spring wood collapses,
  maintaining pressure on the wood during the time interval in which the heat continues to flow into the wood, the maximum temperature has been reached, the direction of heat flow is reversed, and the temperature of the crushed wood fibers has fallen well below 212 degrees F.,
  then releasing the pressure and removing the wood from the press.

10. The method of claim 9 wherein the rapidly applied pressure is increased until stops are reached and pressure is maintained on the wood and the stops.

11. The method of calim 9 with the additional step of applying a thermosetting resin on the wood surface before inserting the plate.

12. The method of claim 9 with the additional step of applying a thermoplastic resin on the wood surface before inserting the plate.

13. The method of densifying a veneer bonded to a fiber board which consists of the steps of,
   selecting a fiber board whose density exceeds that of the veneer, and selecting a veneer whose moisture content exceeds about 6%,
   heating a metal plate to a temperature above about 250 degrees F.,
   inserting the heated plate between the veneer and a cold press platen,
   quickly applying pressure exceeding the pressure of which maximum yield occurs per unit of pressure at the moisture content and temperature used,
   while maintaining pressure, heating the veneer and simultaneously drawing off heat into the press platen,
   continuing pressure until the temperature of the veneer has been raised to its maximum and then fallen well below 212 degrees F.,
   then releasing the pressure and removing the panel from the press.

References Cited

UNITED STATES PATENTS 3,171,167   3/1965   Van Hartesveldt et al. _ 161—164

WILLIAM J. VAN BALEN, Primary Examiner

U.S. Cl. X.R.

144—320; 161—166